United States Patent
McCaffrey

(10) Patent No.: US 10,563,534 B2
(45) Date of Patent: Feb. 18, 2020

(54) BLADE OUTER AIR SEAL WITH SEAL ARC SEGMENT HAVING SECONDARY RADIAL SUPPORTS

(71) Applicant: United Technologies Corporation, Farmington, CT (US)

(72) Inventor: Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 603 days.

(21) Appl. No.: 14/956,443

(22) Filed: Dec. 2, 2015

(65) Prior Publication Data

US 2017/0159481 A1    Jun. 8, 2017

(51) Int. Cl.
| | | |
|---|---|---|
| F01D 11/08 | (2006.01) |
| F01D 25/24 | (2006.01) |
| F01D 5/02 | (2006.01) |
| F01D 5/12 | (2006.01) |
| F01D 21/00 | (2006.01) |
| F01D 25/28 | (2006.01) |
| F16J 15/447 | (2006.01) |

(52) U.S. Cl.
CPC ............... *F01D 11/08* (2013.01); *F01D 5/02* (2013.01); *F01D 5/12* (2013.01); *F01D 21/003* (2013.01); *F01D 25/246* (2013.01); *F01D 25/28* (2013.01); *F16J 15/447* (2013.01); *F05D 2220/32* (2013.01); *F05D 2230/60* (2013.01); *F05D 2240/11* (2013.01); *F05D 2300/20* (2013.01); *F05D 2300/21* (2013.01); *Y02T 50/672* (2013.01)

(58) Field of Classification Search
CPC ......... F01D 11/08; F01D 25/246; F01D 25/28
See application file for complete search history.

(56) References Cited

U.S. PATENT DOCUMENTS

| | | | |
|---|---|---|---|
| 4,442,648 A | 4/1984 | Reece | |
| 4,752,184 A | 6/1988 | Liang | |
| 5,927,942 A | 7/1999 | Stahl et al. | |
| 7,918,642 B2 * | 4/2011 | Leogrande | ............ F01D 11/025 415/118 |

(Continued)

FOREIGN PATENT DOCUMENTS

| | | |
|---|---|---|
| EP | 2546469 | 1/2013 |
| WO | 2015109292 | 7/2015 |
| WO | 2015138027 | 9/2015 |

OTHER PUBLICATIONS

European Search Report for European Patent Application No. 16201459.1 completed Mar. 27, 2017.

*Primary Examiner* — David E Sosnowski
*Assistant Examiner* — Sabbir Hasan
(74) *Attorney, Agent, or Firm* — Carlson, Gaskey & Olds, P.C.

(57) ABSTRACT

A blade outer air seal includes a seal arc segment that has radially inner and outer sides, first and second circumferential ends, and first and second axial sides. The seal arc segment includes first and second primary radial supports at which the seal arc segment can be carried in a primary radial position, and first and second secondary radial supports at which the seal arc segment can be carried in a secondary radial position upon release from the first and second primary radial supports.

20 Claims, 4 Drawing Sheets

(56) References Cited

U.S. PATENT DOCUMENTS

| | | |
|---|---|---|
| 8,439,629 B2 | 5/2013 | Pietraszkiewicz et al. |
| 2010/0303612 A1 | 12/2010 | Bhatnagar et al. |
| 2013/0017057 A1* | 1/2013 | Lagueux ................ F01D 11/08 415/1 |

* cited by examiner

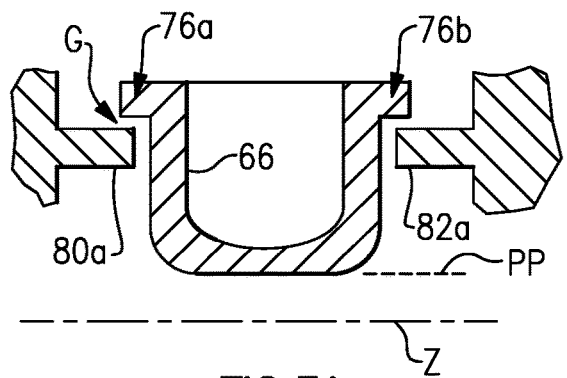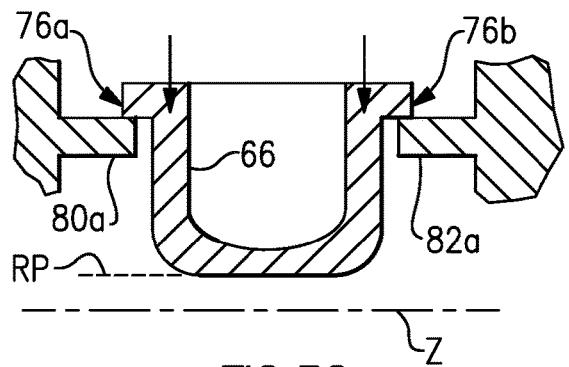
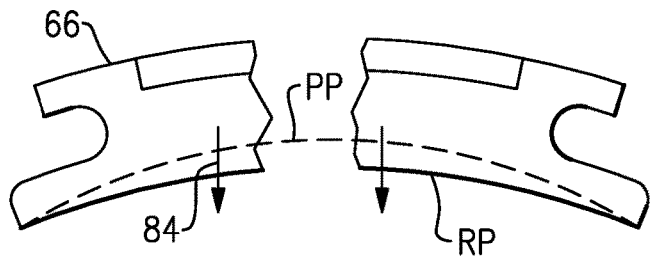
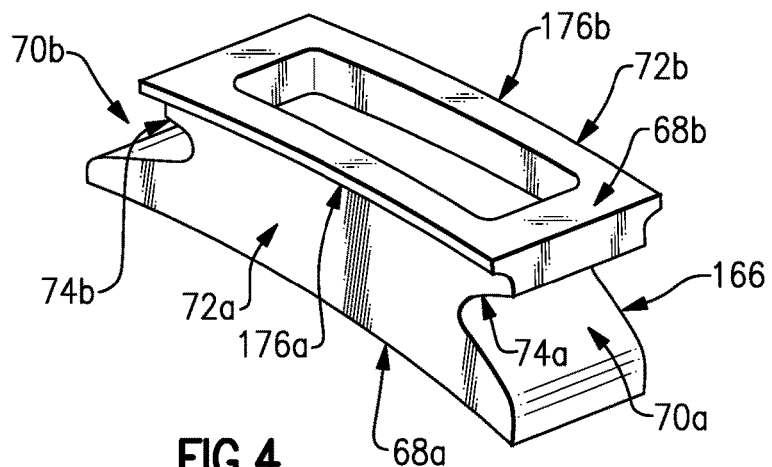

BLADE OUTER AIR SEAL WITH SEAL ARC SEGMENT HAVING SECONDARY RADIAL SUPPORTS

BACKGROUND

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY

A blade outer air seal according to an example of the present disclosure includes a seal arc segment that has radially inner and outer sides, first and second circumferential ends, and first and second axial sides. The seal arc segment includes first and second primary radial supports at which the seal arc segment can be carried in a primary radial position, and first and second secondary radial supports at which the seal arc segment can be carried in a secondary radial position upon release from the first and second primary radial supports.

In a further embodiment of any of the foregoing embodiments, the first and second circumferential ends include the first and second primary radial supports, and the first and second axial sides include the first and second secondary radial supports.

In a further embodiment of any of the foregoing embodiments, the first and second secondary radial supports protrude, respectively, axially forward and aft of the radially inner side.

In a further embodiment of any of the foregoing embodiments, the secondary radial position is radially offset from the primary radial position.

In a further embodiment of any of the foregoing embodiments, the first and second primary radial supports are first hook supports, and the first and second secondary radial supports are second hook supports.

In a further embodiment of any of the foregoing embodiments, the first and second secondary radial supports have a radial dimension and a lateral dimension, and a ratio of the radial dimension to the lateral dimension is 1:1 or greater.

In a further embodiment of any of the foregoing embodiments, the seal arc segment has a U-shape cross-section, with the radially inner side forming the bottom of the U-shape cross-section and the first and second axial sides forming the upright legs of the U-shape cross-section, and the first and second secondary radial supports are at the top of the upright legs.

In a further embodiment of any of the foregoing embodiments, the radially inner side includes a through-hole.

A further embodiment of any of the foregoing embodiments includes a sensor mounted in the through-hole.

In a further embodiment of any of the foregoing embodiments, the seal arc segment is formed of a ceramic material.

A gas turbine engine according to an example of the present disclosure includes a rotor that has a row of rotor blades rotatable about an axis and a blade outer air seal radially outwards of the row of rotor blades. The blade outer air seal includes a plurality of seal arc segments. Each of the seal arc segments have radially inner and outer sides, first and second circumferential ends, and first and second axial sides, a plurality of primary seal supports, and a plurality of secondary seal supports. Each of the seal arc segments includes first and second primary radial supports upon which respective ones of the plurality of primary seal supports carry the seal arc segment in a primary radial position, and first and second secondary radial supports upon which respective ones of the plurality of secondary seal supports carry the seal arc segment in a secondary radial position upon release of the seal arc segment from the first and second primary radial supports.

In a further embodiment of any of the foregoing embodiments, a portion of the plurality of secondary seal supports are on a forward structure and another portion of the plurality of secondary seal supports are on an aft structure.

In a further embodiment of any of the foregoing embodiments, the first and second circumferential ends include the first and second primary radial supports, and the first and second axial sides include the first and second secondary radial supports.

In a further embodiment of any of the foregoing embodiments, the secondary radial position is radially offset from the primary radial position.

In a further embodiment of any of the foregoing embodiments, the first and second secondary radial supports have a radial dimension and a lateral dimension, and a ratio of the radial dimension to the lateral dimension is 1:1 or greater.

In a further embodiment of any of the foregoing embodiments, the seal arc segment has a U-shape cross-section, with the radially inner side forming the bottom of the U-shape cross-section and the first and second axial sides forming the upright legs of the U-shape cross-section, and the first and second secondary radial supports are at the top of the upright legs.

In a further embodiment of any of the foregoing embodiments, the radially inner side includes a through-hole.

A further embodiment of any of the foregoing embodiments includes a sensor mounted in the through-hole.

A method for a blade outer air seal according to an example of the present disclosure includes supporting a seal arc segment in a primary position radially outwards of a rotor that has a row of rotor blades that are rotatable in a rotation zone. The seal arc segment has first and second primary radial supports on which the seal arc segment is carried in the primary radial position upon a release event of the seal arc segment from the primary position. Impingement of the seal arc segment into the rotation zone is limited by catching the seal arc segment in a secondary radial position. The seal arc segment has first and second secondary radial supports on which the seal arc segment is carried in the secondary radial position.

In a further embodiment of any of the foregoing embodiments, the secondary radial position is radially offset from the primary radial position.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 3A shows a seal arc segment in an initial, primary position.

FIG. 3B illustrates a seal arc segment upon a release event.

FIG. 3C shows a seal arc segment after a release event in which the seal arc segment is caught on first and second secondary radial supports.

FIG. 4 shows another example of a seal arc segment.

DETAILED DESCRIPTION

Figure 1:
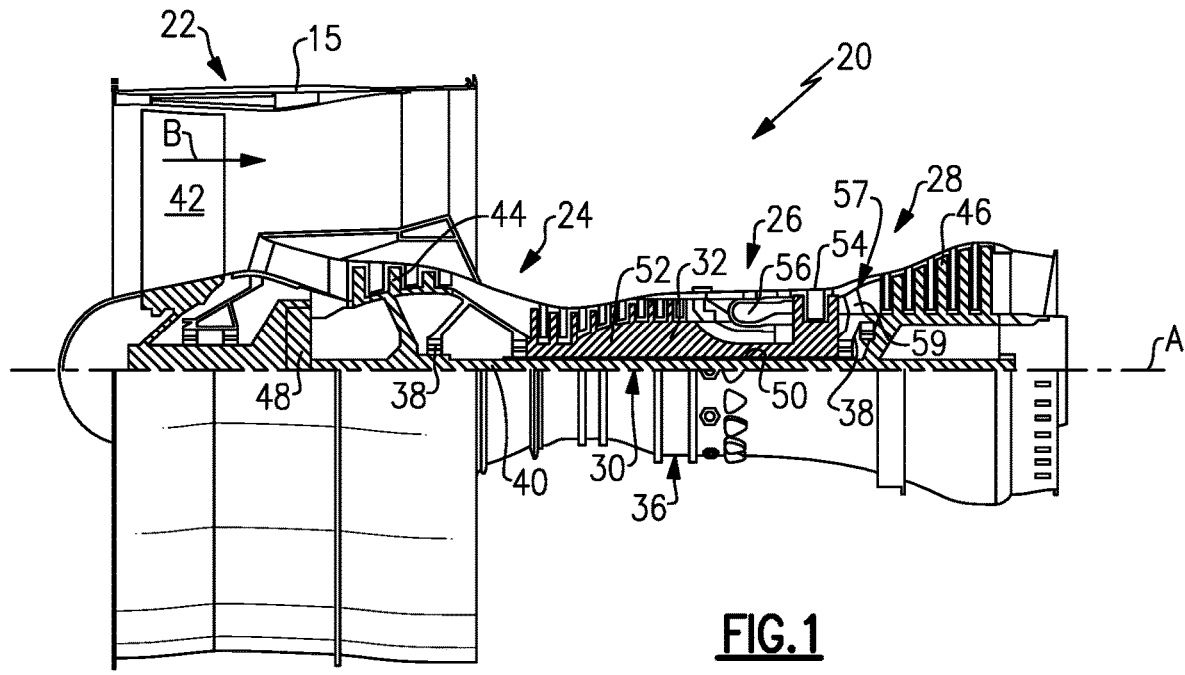
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2A:
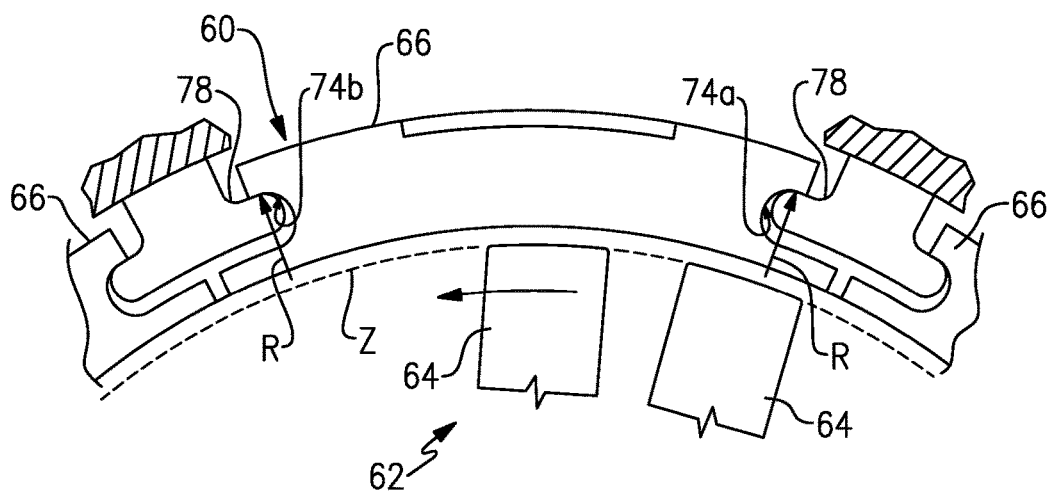
FIG. 2A illustrates an axial view showing a seal system that has a plurality of seal arc segments.

FIG. 2A illustrates an axial view through a portion of one of the stages of the turbine section 28. In this example, the turbine section 28 includes a blade outer air seal 60 that is located radially outwards of a rotor 62 that has a row of rotor blades 64. As can be appreciated, the blade outer air seal 60 can alternatively be adapted for other portions of the engine 20, such as the compressor section 24. The blade outer air seal 60 includes a plurality of seal arc segments 66 that are circumferentially arranged in an annulus around the central axis A of the engine 20. In one example, the seal arc segments 66 (i.e., the body thereof) are formed of a ceramic material, such as a monolithic ceramic or a ceramic matrix composite. The blade outer air seal 60 is in close radial proximity to the tips of the blades 64, to reduce the amount of gas flow that escapes around the blades 64.

Figure 2B:
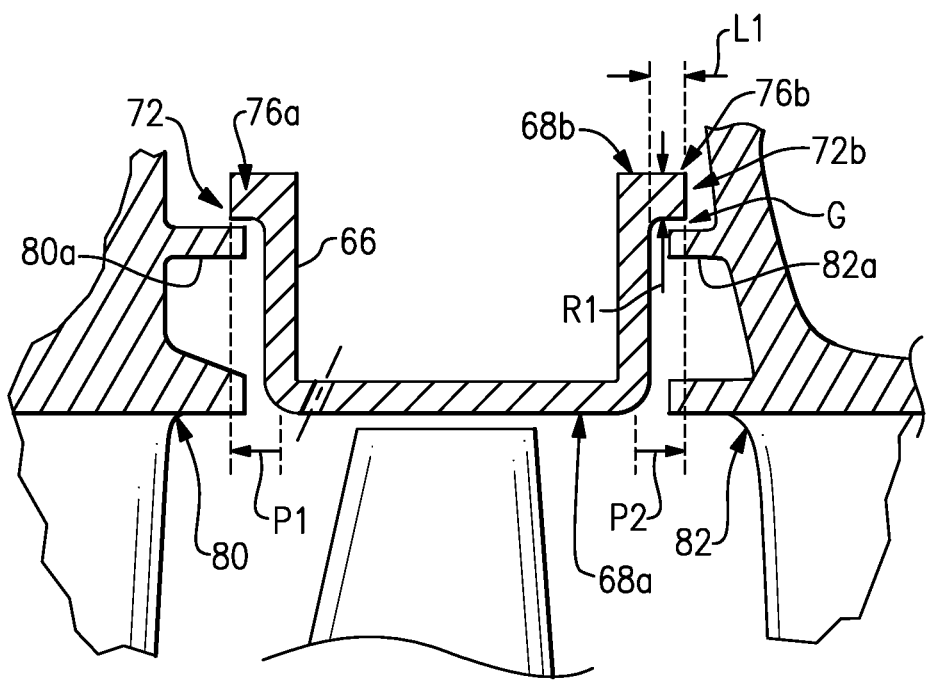
FIG. 2B shows a longitudinal view of one of the seal arc segments.
Figure 2C:
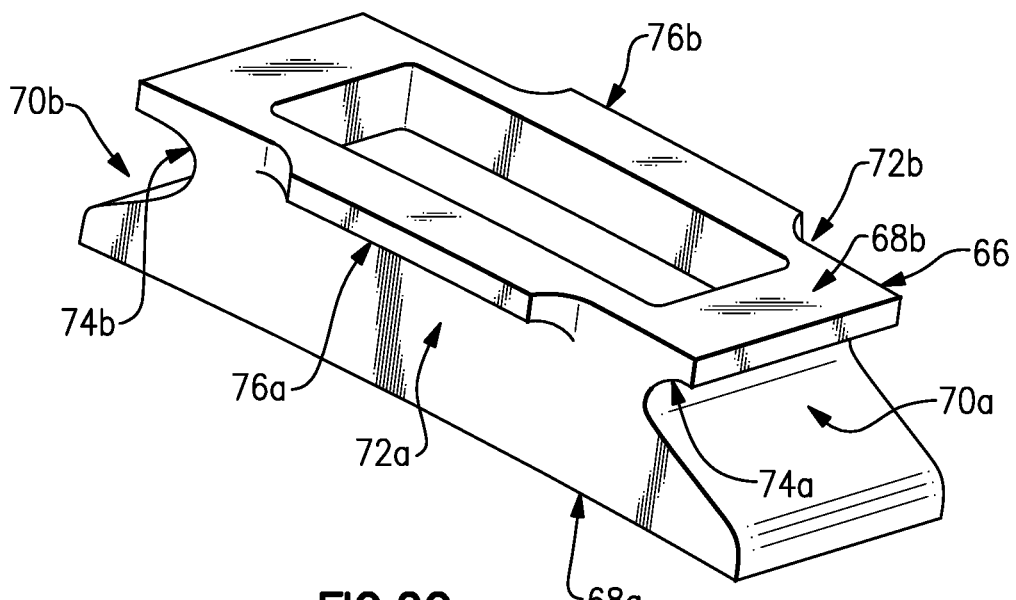
FIG. 2C illustrates an isolated view of a seal arc segment.

FIG. 2B shows a longitudinal cross-section and FIG. 2C shows an isolated view of a representative one of the seal arc segments 66. Each seal arc segment 66 is a body that defines radially inner and outer sides 68a/68b, first and second circumferential ends 70a/70b, and first and second axial sides 72a/72b. The seal arc segment 66 in this example has a U-shape cross-section, with the radially inner side 68a forming the bottom of the U-shape cross-section and the first and second axial sides 72a/72b forming the upright legs of the U-shape cross-section. It is to be understood that the radially inner side 68a faces in a direction toward the engine central axis A. The radially inner side 68a is thus the gas path side of the seal arc segment 66 that bounds a portion of the core flow path C. The first axial side 72a faces in a forward direction toward the front of the engine 20 (i.e., toward the fan 42) and the second axial side 72b faces in an aft direction toward the rear of the engine 20 (i.e., toward the exhaust end).

In this example, the first and second circumferential ends 70a/70b include, respectively, first and second primary radial supports 74a/74b and the first and second axial sides include, respectively, first and second secondary radial supports 76a/76b. The first and second secondary radial supports 76a/76b are located at the top of the upright legs of the U-shape cross-section. For instance, as shown, the primary radial supports 74a/74b and the secondary radial supports 76a/76b are hook supports. In the illustrated example, the secondary radial supports 76a/76b protrude, respectively, from the first and second axial sides 72a/72b. The secondary radial supports 76a/76b protrude, respectively, axially forward and aft of the radially inner side 68a, as represented at P1/P2 (FIG. 2B).

Hangers 78 carry each seal arc segment 66 at the first and second primary radial supports 74a/74b. For example, the geometry of the first and second primary radial supports 74a/74b corresponds to the geometry of the hangers 78 such that the hangers 78 and the first and second primary radial supports 74a/74b interlock to radially support the seal arc segment 66 in a primary radial position (FIG. 2A). For instance, the primary radial position is the initial assembled position and the position in which the seal arc segment 66 is in during operation of the engine 20 (e.g., take-off, landing, cruise, etc.). In this regard, as used in this disclosure, "primary" radial supports are supports that, at least initially, bear the load of the seal arc segment 66; and "secondary" radial supports are supports that bear no load, or substantially less load, of the seal arc segment 66 when the load of the seal arc segment 66 is borne by the primary radial supports.

As will be described in further detail below, upon the occurrence of a release event from the first and second primary radial support 74a/74b, the first and second secondary radial supports 76a/76b serve to carry the seal arc segment 66 and thus limit impingement of the seal arc segment 66 into a rotation zone (represented at "Z" in FIG. 2A) in which the blades 64 rotate.

As shown in FIG. 2B, a forward vane structure 80 includes (forward) secondary seal supports 80a (one shown) and an aft vane structure 82 includes (aft) secondary seal supports 82a (one shown). For example, the vane structures 80/82 can include a neighboring shroud structure that bounds a portion of the core flow path C, a neighboring blade outer air seal structure that bounds a portion of the core flow path C, or the like. In alternative examples, the secondary seal supports 80a/82a are on other adjacent structures to the blade outer air seal 60, such as, but not limited to, an independent support structure that is not related to vane support or air seal support, or a case- or shell-mounted structure.

Initially, when the seal arc segment 66 is carried on the hangers 78 at the first and second primary radial supports 74a/74b in the primary position, the secondary seal supports 80a/82a bear little or no load of the seal arc segment 66. For example, there may be a radial gap, G, between the secondary seal supports 80a/80b and the first and second secondary radial supports 76a/76b. Upon a release event from the first and second primary radial supports 74a/74b, the first and second secondary radial supports 76a/76b "catch" on the secondary seal supports 80a/82a to prevent or limit impingement of the seal arc segment 66 into the rotation zone Z.

The geometry of the first and second secondary radial supports 76a/76b is designed to bear the load of the seal arc segment 66. For instance, each of the first and second secondary radial supports 76a/76b has a defined radial dimension R1 and a defined lateral dimension L1 such that a ratio of R1:L1 is 1:1 or greater. Such a ratio can ensure that there is sufficient radial thickness relative to the lateral dimension to provide strength to bear the load of the seal arc segment 66.

FIGS. 3A, 3B, and 3C illustrate an example release event from the first and second primary radial supports 74a/74b. FIG. 3A shows the seal arc segment 66 in its initial, primary position PP in which it is supported by the first and second primary radial supports 74a/74b (not shown). Upon a release event, an example of which is shown in FIG. 3B, the first and second primary radial supports 74a/74b no longer bear the load of the seal arc segment 66. For example, if the seal arc segment 66 fractures along a mid-portion the two resulting pieces of the seal arc segment 66 may tend to impinge radially inward, as represented at 84. As shown in FIG. 3C, the first and second secondary radial supports 76a/76b catch on the secondary seal supports 80a/82a in a secondary radial position RP, which is radially offset from the primary position, to thus limit impingement of the seal arc segment 66 into the rotation zone. As can be appreciated from the above examples, although the first and second primary radial supports 74a/74b are shown as being located on the first and second circumferential ends 70a/70b, and the first and second secondary radial supports 76a/76b are shown as being located on the first and second axial sides 72a/72b, the primary and secondary radial supports could be switched such that the secondary radial supports are located at the circumferential ends and the primary radial supports are located on the axial sides.

FIG. 4 illustrates another example seal arc segment 166. The first and second secondary radial supports 76a/76b of the seal arc segment 66 are discrete, protruding tabs. The seal arc segment 166 is similar but rather than discrete tabs the first and second secondary radial supports 176a/176b are full length protruding rails. The rails extend the full circumferential length of the radially outer side 68b of the seal arc segment 166. For example, the greater length of the rails in comparison to the tabs may provide a greater area over which to bear the load of the seal arc segment 166.

Figure 5A:
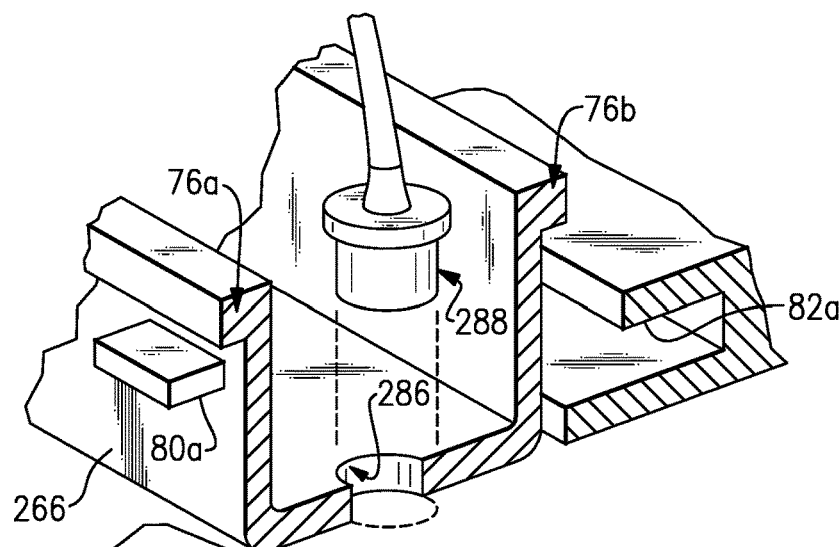
FIG. 5A shows a sectioned perspective view of another example seal arc segment that includes a through-hole and a sensor.
Figure 5B:
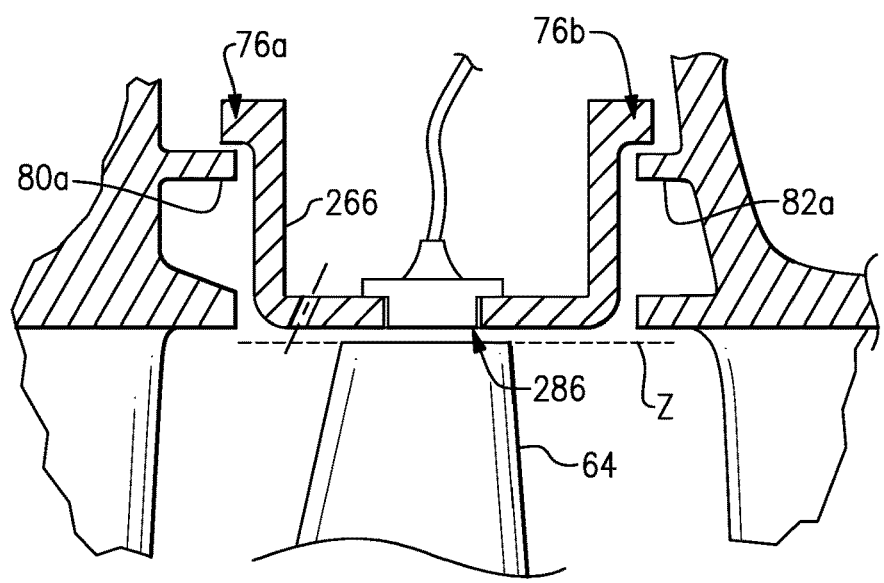
FIG. 5B shows a longitudinal view of the seal arc segment of FIG. 5A.

FIGS. 5A and 5B illustrate another example seal arc segment 266. In this example, the seal arc segment 266 is similar to the seal arc segment 66 but includes at least one through-hole 286 that extends through the bottom of the seal arc segment 266. For example, the seal arc segment 266 includes a sensor 288 that is mounted in the through-hole 286. The sensor 288 may be operable to detect information about the blades 64, such as the rotational speed of the blades 64, and send electronic signals to a remotely located controller. In this regard, the through-hole 286 may act as a stress riser in the seal arc segment 266 and thus increase a potential for fracture that initiates at the through-hole 286. To mitigate the increased potential of fracture, the first and second secondary radial supports 76a/76b are used to reduce impingement into the rotation zone Z if fracture occurs. In particular, if the seal arc segment 266 is formed of a ceramic material, ceramic materials may be sensitive to stress risers. Thus, where a ceramic material is used to form the seal arc segment 266, the features of the first and second secondary radial supports 76a/76b may also be used to reduce the potential for impingement into the rotation zone Z.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A blade outer air seal comprising:
a seal arc segment having radially inner and outer sides, first and second circumferential ends, and first and second axial sides,
the seal arc segment including first and second primary radial supports on which the seal arc segment is carried in a primary radial position, and first and second secondary radial supports on which the seal arc segment is carried in a secondary radial position upon release from the first and second primary radial supports.

2. The blade outer air seal as recited in claim 1, wherein the first and second circumferential ends include the first and second primary radial supports, and the first and second axial sides include the first and second secondary radial supports.

3. The blade outer air seal as recited in claim 2, wherein the first and second secondary radial supports protrude, respectively, axially forward and aft of the radially inner side.

4. The blade outer air seal as recited in claim 1, wherein the secondary radial position is radially offset from the primary radial position.

5. The blade outer air seal as recited in claim 1, wherein the first and second primary radial supports are first hook supports, and the first and second secondary radial supports are second hook supports.

6. The blade outer air seal as recited in claim 1, wherein the first and second secondary radial supports have a radial dimension and a lateral dimension, and a ratio of the radial dimension to the lateral dimension is 1:1 or greater.

7. The blade outer air seal as recited in claim 1, wherein the seal arc segment has a U-shape cross-section, with the radially inner side forming the bottom of the U-shape cross-section and the first and second axial sides forming the upright legs of the U-shape cross-section, and the first and second secondary radial supports are at the top of the upright legs.

8. The blade outer air seal as recited in claim 1, wherein the radially inner side includes a through-hole.

9. The blade outer air seal as recited in claim 8, further comprising a sensor mounted in the through-hole.

10. The blade outer air seal as recited in claim 1, wherein the seal arc segment is formed of a ceramic material.

11. A gas turbine engine comprising:
a rotor including a row of rotor blades rotatable about an axis;
a blade outer air seal radially outwards of the row of rotor blades, the blade outer air seal including a plurality of seal arc segments, each of the seal arc segments having radially inner and outer sides, first and second circumferential ends, and first and second axial sides;
a plurality of primary seal supports; and
a plurality of secondary seal supports,
wherein each of the seal arc segments includes first and second primary radial supports upon which respective ones of the plurality of primary seal supports carry the seal arc segment in a primary radial position, and first and second secondary radial supports upon which respective ones of the plurality of secondary seal supports carry the seal arc segment in a secondary radial position upon release of the seal arc segment from the first and second primary radial supports.

12. The gas turbine engine as recited in claim 11, wherein a portion of the plurality of secondary seal supports are on a forward vane structure and another portion of the plurality of secondary seal supports are on an aft vane structure.

13. The gas turbine engine as recited in claim 11, wherein the first and second circumferential ends include the first and second primary radial supports, and the first and second axial sides include the first and second secondary radial supports.

14. The gas turbine engine as recited in claim 11, wherein the secondary radial position is radially offset from the primary radial position.

15. The gas turbine engine as recited in claim 11, wherein the first and second secondary radial supports have a radial dimension and a lateral dimension, and a ratio of the radial dimension to the lateral dimension is 1:1 or greater.

16. The gas turbine engine as recited in claim 11, wherein the seal arc segment has a U-shape cross-section, with the radially inner side forming the bottom of the U-shape cross-section and the first and second axial sides forming the upright legs of the U-shape cross-section, and the first and second secondary radial supports are at the top of the upright legs.

17. The gas turbine engine as recited in claim 11, wherein the radially inner side includes a through-hole.

18. The gas turbine engine as recited in claim 17, further comprising a sensor mounted in the through-hole.

19. A method for a blade outer air seal, the method comprising:
supporting a seal arc segment in a primary position radially outwards of a rotor that has a row of rotor blades that are rotatable in a rotation zone, the seal arc segment having first and second primary radial supports on which the seal arc segment is carried in the primary radial position; and
upon a release event of the seal arc segment from the primary position, limiting impingement of the seal arc segment into the rotation zone by catching the seal arc segment in a secondary radial position, the seal arc segment having first and second secondary radial supports on which the seal arc segment is carried in the secondary radial position.

20. The method as recited in claim 19, wherein the secondary radial position is radially offset from the primary radial position.

\* \* \* \* \*